US006839552B1

(12) United States Patent
Martin

(10) Patent No.: US 6,839,552 B1
(45) Date of Patent: Jan. 4, 2005

(54) SYSTEM AND METHOD FOR REPORTING AN EMERGENCY SITUATION

(75) Inventor: Dannie E. Martin, Casselberry, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 401 days.

(21) Appl. No.: 09/746,648

(22) Filed: Dec. 26, 2000

(51) Int. Cl.[7] .................................................. H04Q 7/20
(52) U.S. Cl. .................. 455/404.1; 455/420; 455/414.1
(58) Field of Search ........................... 455/404.1, 414.1, 455/418–420, 456.3, 566, 404, 414, 456–457, 421, 408, 411, 521, 566.1, 404.2; 379/37

(56) References Cited

U.S. PATENT DOCUMENTS

| | | | | |
|---|---|---|---|---|
| 5,663,734 A | | 9/1997 | Krasner | |
| 5,890,061 A | * | 3/1999 | Timm et al. | 455/404.2 |
| 6,011,967 A | * | 1/2000 | Wieck | 455/404 |
| 6,198,914 B1 | * | 3/2001 | Saegusa | 455/404.2 |
| 6,208,877 B1 | * | 3/2001 | Henry, Jr. | 455/566 |
| 6,477,362 B1 | * | 11/2002 | Raith et al. | 455/404.1 |
| 6,477,363 B1 | * | 11/2002 | Ayoub et al. | 455/404.2 |
| 6,518,957 B1 | * | 2/2003 | Lehtinen et al. | 345/173 |
| 6,687,497 B1 | * | 2/2004 | Parvulescu et al. | 455/420 |

FOREIGN PATENT DOCUMENTS

EP 0 930 770 A2 * 7/1999 ............ H04N/1/00

OTHER PUBLICATIONS

James M. Zagami et al., "Providing Universal Location Services Using a Wireless E911 Location Network", IEEE Communications Magazine, Apr. 1998, pp. 66–71.

James J. Caffery, Jr., et al, "Overview of Radiolocation in CDMA Cellular Systems", IEEE Communications Magazine, Apr. 1998, pp. 38–45.

Mark Moeglein, et al. "An Introduction to Snap Track Server –Aided GPST Technology", available at http://www.snaptrack.com/atwork.html.

* cited by examiner

*Primary Examiner*—William Trost
*Assistant Examiner*—Brandon J. Miller
(74) *Attorney, Agent, or Firm*—Cantor Colburn LLP

(57) ABSTRACT

The present invention is a system and method for reporting an emergency situation to a called party a using a wireless device. The wireless device comprises a keyboard and a microprocessor. In one embodiment, when a specific keystroke sequence is entered using the keyboard, the wireless device performs the following tasks: (1) disabling one or more components of the wireless device; (2) establishing a wireless communication session with the called party; (3) communicating with a location system to generate location information pinpointing the location of the wireless device; and (5) providing the location information to the called party. In other embodiments, the wire device performs additional tasks, including: (6) capturing content during the wireless communication; (7) communicating with the location system to generate subsequent location information; and (8) providing one or more of the subsequent location information and the content to the called party. The called party may then use the location information and the content to perform one or more actions, including providing help to the user of the wireless device.

58 Claims, 5 Drawing Sheets

SYSTEM AND METHOD FOR REPORTING AN EMERGENCY SITUATION

BACKGROUND

1. Field of the Invention

The present invention relates generally to telecommunications, and more particularly to a system and method for reporting an emergency situation using a wireless device.

2. Background of the Invention

Being a victim of a crime can be a terrible thing for any person. The experience of being the victim could be even worse if the victim could not communicate with others to obtain help. For example, a person being kidnapped or car-jacked is unable to call the police, especially if the person is ordered by his or her kidnapper to disable his or her wireless telephone. Even in a situation in which the kidnapper was initially unaware of the presence of the wireless telephone, the victim's safety could be in jeopardy when his or her attempt to use the wireless telephone is intercepted by the kidnapper.

The widespread use of the wireless telephones in the United States has prompted the Federal Communications Commission (FCC) to promulgate new rules related to emergency call processing. The. FCC's wireless Enhanced 911 (E911) rules require certain Commercial Mobile Radio Services (CMRS) carriers to begin transmission of enhanced location and identity information in two phases. The first phase, started on Apr. 1, 1998, required wireless service providers to transmit a 911 caller's number and section of the cell site from which the call is originated to a Public Safety Answering Point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication networks and wireless telephones (or any wireless devices that can be used to call 911), must provide both the identity and location of the caller to a 911 dispatcher. To provide a caller's identity, the wireless device must furnish a device identification, e.g., a mobile identification number (MIN), indicating in most instances the telephone number of the device. To provide a caller's location, tile wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The contemplated E911 location technology will enable the PSAP to know the location of the wireless telephone at the time the 911 call is established. However, the caller must physically dial the number, and the wireless telephone must remained active or on to enable the PSAP to track the location of the wireless telephone. The current technology does not provide a wireless device that can be used to report an emergency situation, and at the same time, appears to have been powered off.

SUMMARY OF THE INVENTION

The present invention is a system and method for using a wireless device to report an emergency situation to a called party. The wireless device may be any apparatus with telecommunication capabilities. For example, the wireless device may be a wireless telephone, an interactive pager, a handheld computer, or a personal digital assistant.

A wireless device of the present invention comprises a microprocessor, a location system, an input device, and an output device. The input device may be a keypad or a keyboard. The output device ray be a display commonly found on the wireless devices mentioned above. A preferred embodiment of the present invention can comprise additional devices, including one or more of a signal detector and a sensing device.

A wireless device of the present invention can maintain a wireless communication session with a called party while the wireless device appears to have been powered off. The called party may be a PSAP. The present invention may be used, for example, by a victim of a crime to report the crime without alerting the criminal. In another example, an undercover law enforcement agent can use the wireless device to transmit a conversation to his or her operation center secretly.

A preferred method for using the present invention comprises the following steps. First, a relationship between a telephone number that is associated with the called party (the called number) and a sequence of keystrokes is created, and the relationship is programmed into the wireless device. Second, a user of the wireless device (the caller) inputs the sequence using the input device when the caller wishes to contact the called party. Third, the microprocessor deactivates one or more components of the wireless device, including the display. Fourth, the microprocessor, in conjunction with other components of the wireless device, establishes a wireless communication session with the called party. Fifth a location system generates location information pinpointing the location of the wireless device and provides the location information to the called party.

In other embodiments, the following additional steps may be included. Sixth, the sensing device of the wireless device can capture content comprising, for example, sound. Seventh, the content can be transmitted to the called party. Eighth, the wireless communication session can remain active to enable the location system to provide subsequent location information to the called party.

It is an object of the present invention to provide a safe method for reporting a crime.

It is another object of the present invention to enable spontaneous. transmission of information to a called party when a wireless communication session is established.

It is another object of the present intention to establish a wireless communication session when a stimulus is received by the wireless device.

These and other objects of the present invention are described in greater detail in the detailed description of the invention, the appended drawings, and the attached claims.

DETAILED DESCRIPTION OF THE INVENTION

Figure 1:
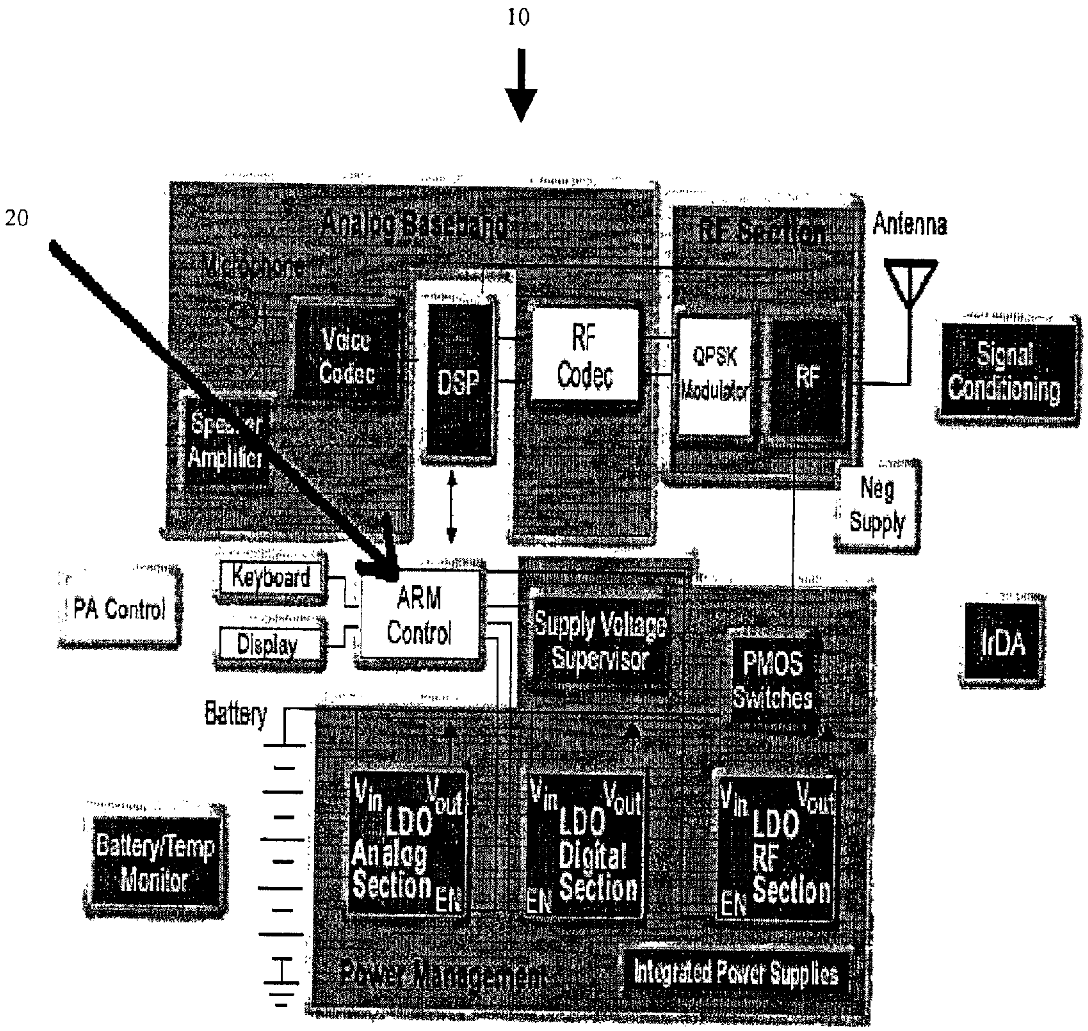
FIG. 1 is a block diagram of a prior art wireless telephone.

FIG. 1 is a block diagram of a prior art wireless telephone 10. ARM control 20 is a microprocessor that is part of prior art wireless telephone 10. As known to one skilled in the art, the various components of wireless telephone 10 be adapted for the system architecture of the present invention.

Figure 2:
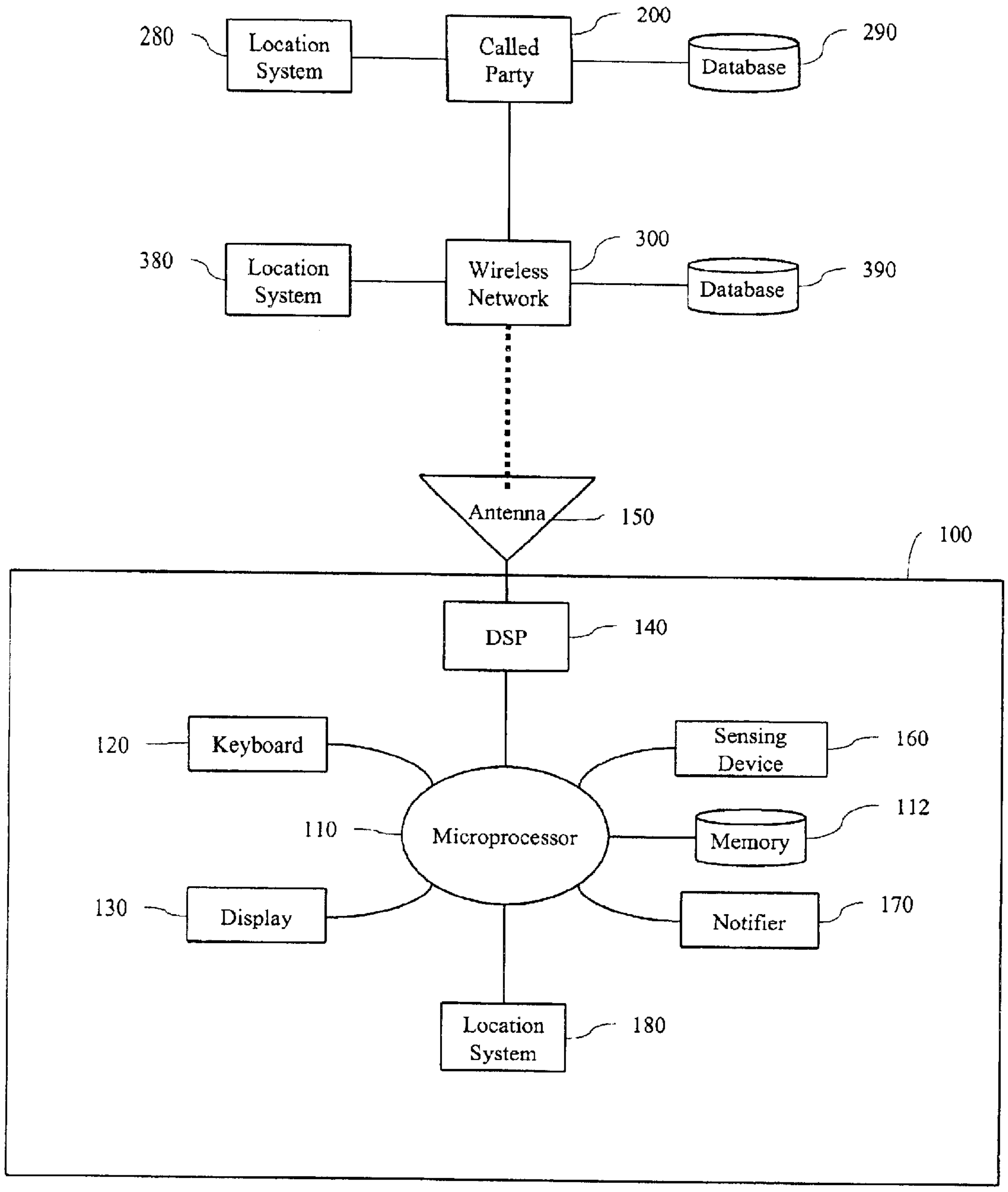
FIG. 2 is a schematic diagram showing the system architecture of an embodiment of the present invention.

FIG. 2 is a schematic diagram showing the system architecture of an embodiment of the present invention. The system of the present invention comprises microprocessor 110, keyboard 120, and display130, each of which is a component of wireless device 100. Microprocessor 110 is preferably a RISC (reduced instruction set computer) microprocessor. Keyboard 120 is an example of an input device. Display 130 is an example of an output device. Wireless device 100 may be any wireless communication equipment that can be used to establish a wireless communication session with a called party, such as called party 200. Examples of wireless device 100 include a wireless telephone, an interactive pager, a handheld computer, and a personal digital assistant.

Microprocessor 110 is in communication with keyboard 120 and display 130. In preferred embodiments, microprocessor 110 can also be in communication with digital signal processor (DSP) 140, antenna 150, sensing device 160, and notifier 170, each of which a component of wireless device 100. Sensing device 160 may be, for example, one or more of a microphone, a camera, a thermometer, and a barometer. Sensing device 160 can capture content. The content can include one or more of sound, still or moving images, temperature, and pressure, depending on the type of sensing device used. Notifier 170 may be any component that can be used to notify the user of wireless device 100 when an incoming call is received by wireless device 100. For example, it may be a ringer or a vibrator. Microprocessor 110 is preferably in communication with memory 112, which is also a component of wireless device 100.

Wireless device 100 can establish a wireless communication session with called party 200 through wireless network 300. The present invention can further comprise one or more of location system 180, location system 280, and location system 380, which are associated with wireless device 100, called party 200, and wireless network 300, respectively.

At least one of location systems 180, 280, and 380 can generate location information pinpointing the location of wireless device 110 during the wireless communication session. The location information may be generated using any known methods. For example, location system 180 may be a Global Positioning System (GPS) receiver that is in communication with a constellation of GPS satellites, which produces position coordinates of wireless device 100. U.S. Pat. No. 5,663,734, which is incorporated herein by reference, discloses a GPS receiver and a method for processing GPS signals.

Location systems 180, 280, and 380 may generate the location information using one of several methods. For example, the method published by James J. Caffery, Jr. and Gordon L. Stüber in IEEE Communications Magazine (April 1998) may be used. The article titled "Overview of Radiolocation in CDMA Cellular Systems" is hereby incorporated by reference. One or both of called party 200 and wireless network 300 can be associated with a database, which is shown in FIG. 2 as database 290 and database 390, respectively.

Figure 3:
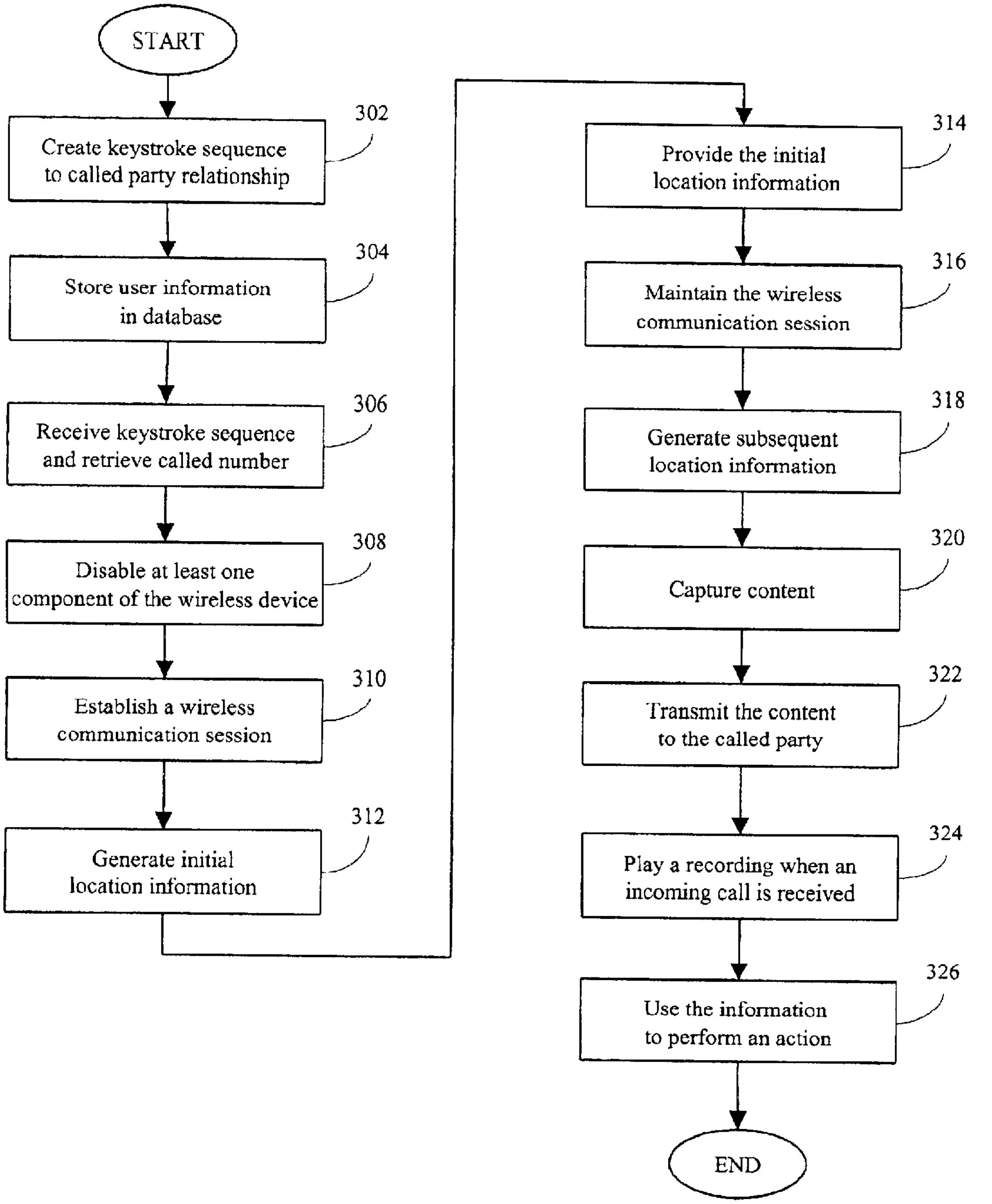
FIG. 3 is a flowchart showing the general steps involved in using an embodiment of the present invention.

FIG. 3 is a flowchart showing the general steps involved in using an embodiment of the present invention. In specific embodiments of the present invention, one or more of these general steps may be used. Furthermore, each of the general steps may include one or more sub-steps in the specific embodiments. Although these general steps and sub-steps are discussed herein sequentially, the steps may be implemented in any combination and in any logical order to accomplish a specific purpose. Furthermore, specific embodiments of the present invention may include additional unique steps that are not discussed herein as part of the general steps.

In step 302, at least one relationship between a keystroke sequence and a telephone number associated with called party 200 (the called number) can be defined or created. The relationship may be stored in memory 112 shown in FIG. 2. Memory 112 can be accessible by microprocessor 110 of wireless device 100. A first specific example of the keystroke sequence may comprise pressing the "power off" key while holding down the "*" key on keyboard 120. A second specific example of the keystroke sequence may comprise pressing the "power-off" key a number of times. In still another specific example of the relationship, the keystroke sequence may comprise pressing a plurality of keys seriatim.

In step 304, information related to wireless device 100 can be stored in the memory. The information may comprise the relationship created in step 102 and a user profile. The user profile may comprises, for example, the name of the user of wireless device 100, the medical record of the user, the type of vehicle owned by the user, and/or the vehicle's license plate number. The information can be provided to called party 200 when the keystroke sequence is used to establish the wireless communication session. The information may also be stored in a database accessible by called party 200. For example, the information may be stored in at least one of database 290 and database 390.

In step 306, when a user of wireless device 100 inputs the keystroke sequence on keyboard 120, microprocessor 110 can retrieve the called number from memory 112. In a specific example, if the user presses the "power-off" key while holding down the "*" key, microprocessor 110 knows that 911 is to be used as the called number. Other keystroke sequences can associate other telephone numbers with other called parties. In step 308, at least one component of wireless device 100 can deactivated or disabled by microprocessor 110. The component may be a display, e.g., display 130, or a notifier, such as notifier 170, or both. Deactivation of display 130 creates an appearance that wireless device 100 has been powered off. Deactivation of notifier 170 prevents any incoming call intended for wireless device 100 from alerting any person in the vicinity of wireless device 100 of the existence of wireless device 100. As known to one skilled in the art, wireless device 100 can be programmed with these functions.

In step 310, microprocessor 110 can use the called number to establish a wireless communication session with called party 200. In the first specific example, the microprocessor can use "911" as the called number to call a PSAP as called party 200. The wireless communication session can be established using a number of components of wireless device 100, including DSP 140 and antenna 150.

In step 312, initial location information can be generated by at least one location system, which may be one or more of location systems 180, 280, and 380. The initial location information can pinpoint the location of wireless device 100 at the time the initial location information is generated. The initial location information may be generated using any of the known methods discussed above. In step 314, the initial location information can provided to called party 200 during the wireless communication session. The initial location information is preferably provided to called party 200 as soon as it is generated.

In step 316, the wireless communication session is maintained. Called party 200 preferably has exclusive control over the wireless communication session. Exclusive control means that only called party 200 can terminate the session. The exclusive control can prevent the wireless communication session from being terminated by anyone, whether accidentally or intentionally.

In step 318, subsequent location information can be generated by one or more of location systems 180, 280, and 380. The subsequent location information can be generated based on a rule. The rule is preferably stored in one or more of memory 112, database 290, and database 390, to operate location system 180, location system 280, and location system 380, respectively. The rule may comprise generating the subsequent location information continuously. The rule may comprise generating the subsequent location information at regular intervals. The regular intervals may be every few seconds, minutes, or hours, depending on specific application of the embodiment. The subsequent location information can pinpoint a subsequent location of wireless device 100 at the time the subsequent location information is generated. The subsequent location information is preferably provided to called party 200 as soon as it is generated.

In step 320, content surrounding wireless device 100 can be captured by sensing device 160. Sensing device 160 may be one of several instruments. For example, a microphone may be used as sensing device 160 to capture sound as the content. Similarly, if the content comprises images, the appropriate sensing device would be a camera. A thermometer and a barometer are appropriate sensing devices for temperature and pressure, respectively. The content can be transmitted to called party 200 in step 322.

In step 324, a recording can be played when an incoming call is received from a third party. The recording may comprise, for example, "Normal functioning of this wireless device is currently suspended. Please leave a message." The recording may also comprise, for example, "I am in trouble, please call the police." The recording may further comprise the most current location information at the time the recording is played. The recording can be created by microprocessor 110. The recording may also be a prerecorded message stored in memory 112.

In step 326, called party can use one or more of the user information, the location information, and the content to perform an action. The action may comprise, for example, dispatching an emergency response team to the location, and/or using the content as evidence in a litigation.

There are a number of specific embodiments that may be implemented. For example, in a first specific embodiment, a crime victim can use the wireless device of the present invention to report a crime in progress to a PSAP. In a second specific embodiment, a law enforcement agent can use the wireless device in an undercover operation. Other embodiments may also be implemented.

Figure 4:
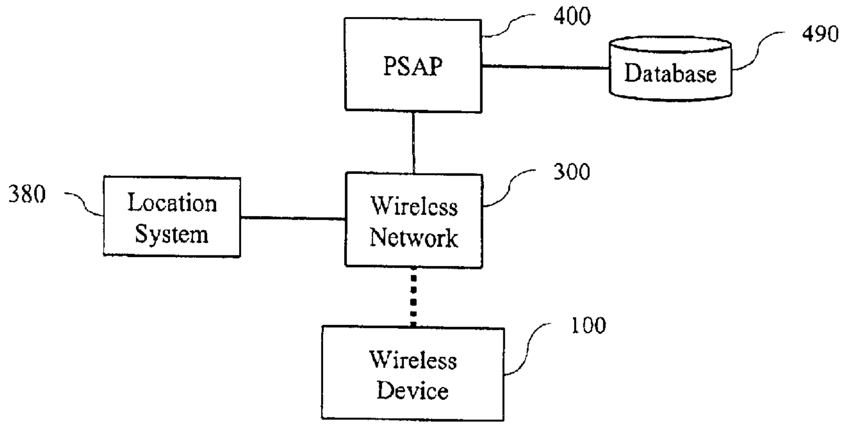
FIG. 4 is a schematic diagram showing the system architecture of a first preferred embodiment of the present invention, wherein a crime victim can use a wireless device to report a crime in progress to a PSAP.

FIG. 4 is a schematic diagram showing the system architecture of a first preferred embodiment of the present invention, wherein a crime victim can use wireless device 100 to report a crime in progress to PSAP 400. Database 490 is a database that is accessible by PSAP 400. Database 490 comprises, among other things, information of the kind typically maintained in a 911 database. A specific example involving a victim being car-jacked is described herein to demonstrate how the present invention may be implemented. Wireless device 100 in this embodiment can be a wireless telephone, which is a node of wireless network 300. Location system 380 is a component of wireless network 300.

Figure 5:
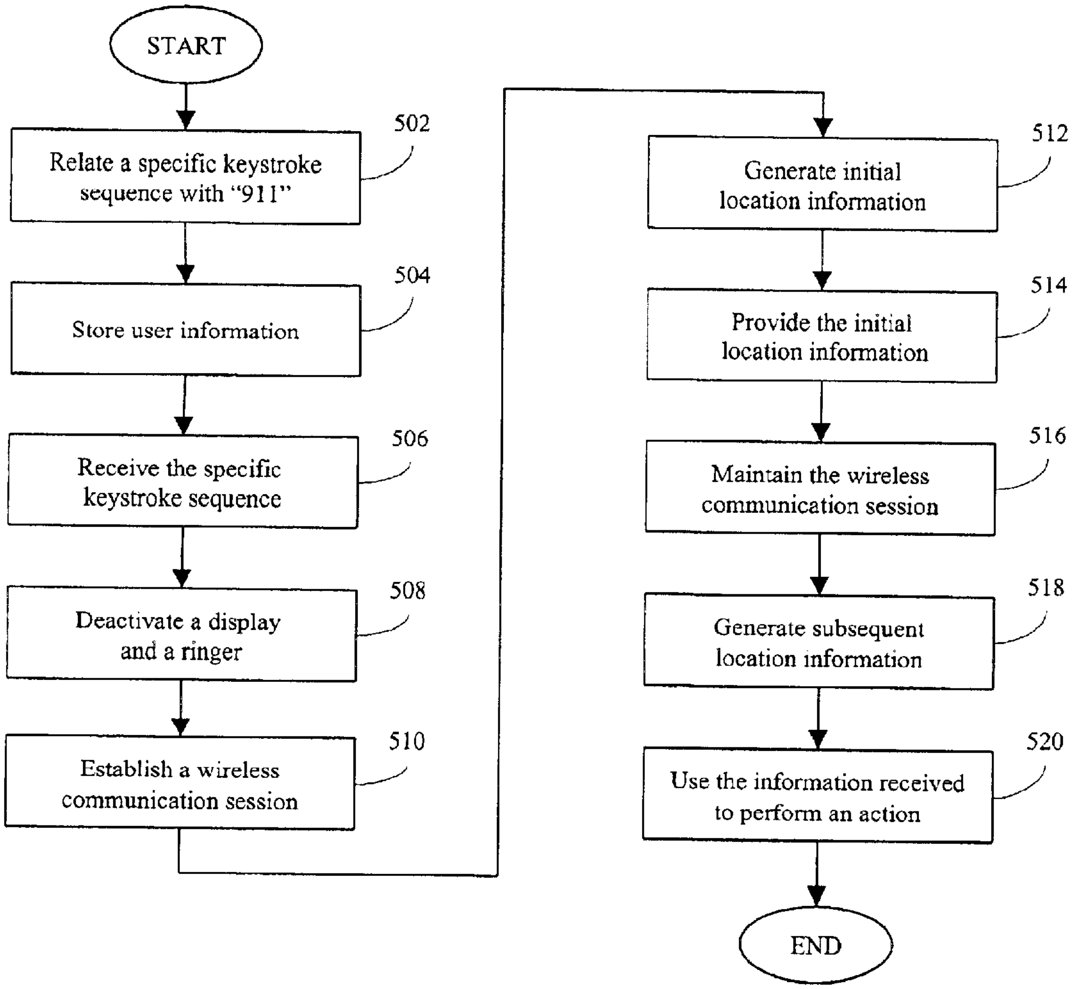
FIG. 5 is a flowchart showing the steps involved in using the first preferred embodiment of the present invention.

FIG. 5 is a flowchart showing the steps involved in using the first preferred embodiment of the present invention. In step 502, a specific keystroke sequence can be related to "911" as the called number. For example, the keystroke sequence might comprise holding the "*" key down while the pressing the "power off" key. The relationship can be stored in memory 112 of wireless device 100. In step 504, information related to the user of wireless device 100 can be stored in a database. The database may be database 490. The information can comprise the identity of wireless device 100, the identity of the owner of wireless device 100, as well as information related to the owner's vehicle, including the tag number, color, make, and model year of the vehicle.

In step 506, the specific keystroke sequence is received by wireless device 100. For example, when the owner is being forced by a carjacker to turn off wireless device 100, she can hold the "*" key down while pressing the "power off" key on keyboard 120 of wireless device 100 to enter the specific keystroke sequence defined in step 502. In step 508, display 130 of wireless device 100 can immediately go inactive, giving an appearance that wireless device 100 has been turned off. Preferably, notifier 170 of wireless device 100 is also deactivated at the same time. Moreover, incoming audio can also be muted so that noise is not heard from wireless device 100.

In step 510, unbeknown to the carjacker, wireless device 100 can establish a wireless communication session with PSAP 400. The wireless communication session can be initiated by microprocessor 110 that dials 911 because it had recognized the specific keystroke sequence to be related to 911. In step 512, a location system, such as location system 380, can generate initial location system pinpointing the location of wireless device 100. In step 514, the initial location system is preferably provided to PSAP 400 as soon as it is generated.

In step 516, the wireless communication session is maintained. Preferably, PSAP 400 has exclusive control over the wireless communication session. Exclusive control means that only PSAP 400 can terminate the session. In step 518, location system 380 can generate subsequent location information. The subsequent location information may be generated continuously, or it may be generated at regular intervals, e.g., every minute or every five minutes. The subsequent location information can pinpoint a subsequent location of wireless device 100. The subsequent location information is preferably provided to PSAP 400 as soon as it is generated. In step 520, PSAP 400 can use one or both of the initial and subsequent location information to perform an action. The action may be to dispatch an emergency response team to assist the use'r of wireless device 100.

Figure 6:
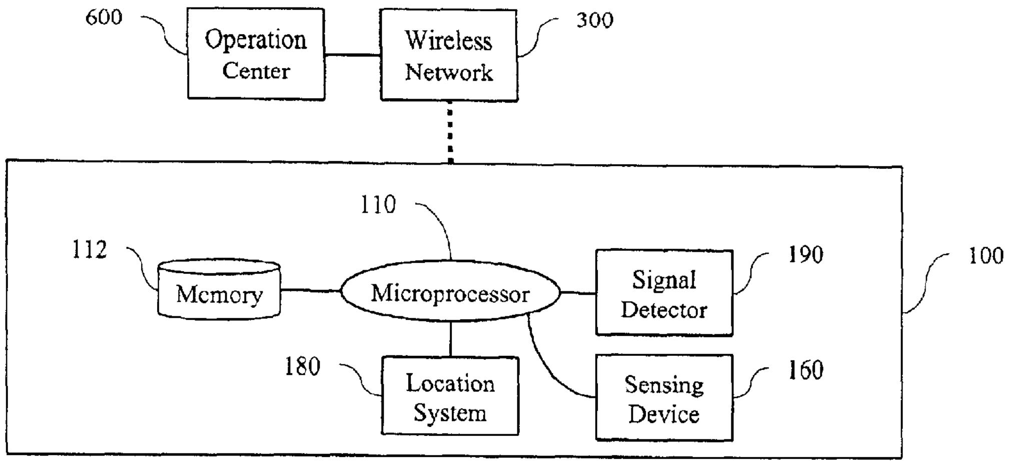
FIG. 6 is a schematic diagram showing the system architecture of a second preferred embodiment of the present invention, wherein a law enforcement agent can use the wireless device during an undercover operation.

FIG. 6 is a schematic diagram showing the system architecture of a second preferred embodiment of the present invention, wherein a law enforcement agent can use the wireless device during an undercover operation. Operation center 600 is the called party in this embodiment. Wireless device 100 and operation center 600 are nodes of wireless network 300. Microprocessor 110, memory 112, sensing device 160, location system 180, and signal detector 190 are components of wireless device 100. Sensing device 160 may be any instruments that can capture content. For example, sensing device 160 may be one or more of a microphone, a camera, a thermometer, and a barometer. Signal detector 190 is an electronic device that can detect signals or stimuli associated with the content such as sound, images, temperature, and pressure. Sensing device 160 and signal detector 190 may be an integrated component.

Figure 7:
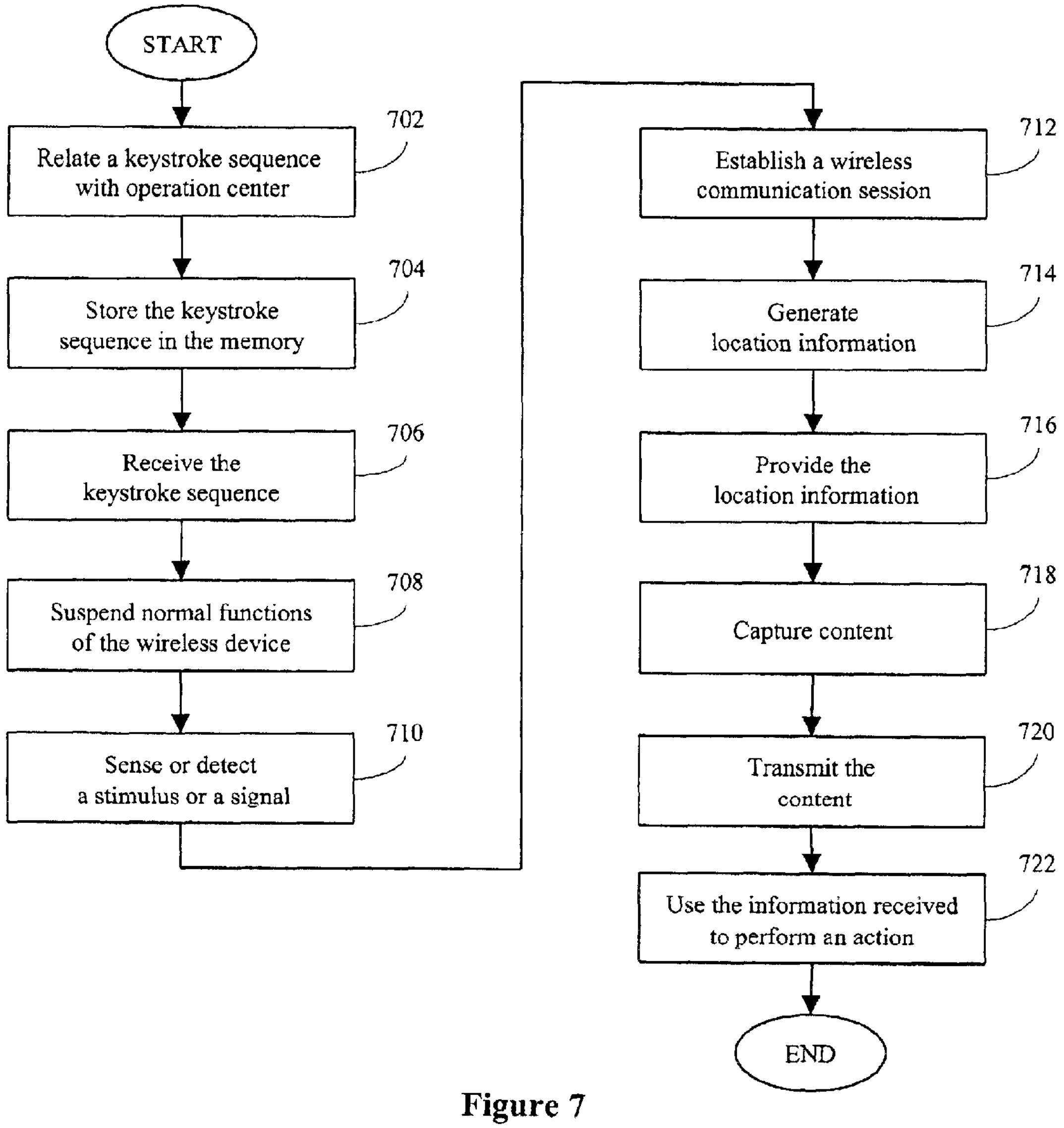
FIG. 7 is a flowchart showing the steps involved in using the second preferred embodiment of the present invention.

FIG. 7 is a flowchart showing the steps involved in using the second preferred embodiment of the present invention. In step 702, a keystroke sequence is related to the telephone number that is associated with operation center 600. The specific keystroke sequence may comprise, for example, pressing one special key on keyboard 120. In step 704, the keystroke sequence and the telephone number of operation center 600 can be stored in memory 112. In step 706, when the undercover officer presses the special key on keyboard 120, the keystroke sequence is received by microprocessor 110.

In step 708, microprocessor 110 can suspend normal functions of wireless device 110 so that wireless device 100 has an appearance of being powered off. Wireless device 100 preferably has voice recognition capabilities. Wireless device 100 can be equipped with signal detector 190. Signal detector 190 is preferably an electronic device that is sensitive to picking up signals or stimuli having certain characteristics. For example, signal detector 190 may be programmed to recognize a stimulus or signal comprising certain words of the undercover officer such as "Hello."

Signal detector 190 can detect a stimulus or signal in step 710. The stimulus may be the word "Hello" uttered by the undercover officer. Once the signal is detected, microprocessor 110, in step 712, can establish a wireless communication session with operation center 600. In step 714, location system 180 can generate location information pinpointing the location of wireless device 100. In step 716, the location information can be provided to operation center 600. In step 718, sensing device 160 can capture content. For example, if sensing device 160 is microphone, sounds surrounding wireless device 100 may be captured by it. In step 720, wireless device 100 can transmit the content captured by sensing device 160 to operation center 600. In step 722, one or more of the location information and the content may be used to perform an action. The action may be to use the information received by operation center 600 as evidence in a litigation.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. A wireless device for reporting an emergency situation to a called party, the wireless device comprising:

a microprocessor;

a keyboard in communication with the microprocessor;

a display in communication with the microprocessor; and a location system in communication with the microprocessor, wherein when a keystroke sequence is received by the keyboard, the microprocessor disables the display, mutes incoming audio signals, and establishes a wireless communication session with the called party; and wherein when the wireless communication session is established, the location system generates location information and provides the location information to the called party.

2. The wireless device of claim 1, further comprising a memory, wherein the memory comprises the relationship between the keystroke sequence and the called party.

3. The wireless device of claim 2, wherein the memory comprises a user profile.

4. The wireless device of claim 3, wherein the user profile is transmitted to the called party during the wireless communication session.

5. The wireless device of claim 1, wherein the called party provides the location information to a third party.

6. The wireless device of claim 1, wherein the keystroke sequence comprises one of pressing a plurality of keys in seriatim, pressing one key one or more times, and pressing a first key while holding down a second key.

7. The wireless device of claim 1, wherein the called party has exclusive control over the wireless communication session.

8. The wireless device of claim 1, wherein the location system generates subsequent location information, and wherein the subsequent location information is provided to the called party during the wireless communication session.

9. The wireless device of claim 1, wherein the wireless device is selected from the group of a wireless telephone, a pager, a handheld computer, and a personal digital assistant.

10. The wireless device of claim 1, wherein the location system is a GPS receiver.

11. A system for reporting an emergency situation to a called party, the system comprising:

a wireless device in a wireless network, wherein the wireless device comprises a microprocessor, a keyboard, and a display; and a location system, wherein the location system is in communication with the wireless device, wherein when a keystroke sequence is received by the keyboard, the microprocessor disables the display, mutes incoming audio signals, and establishes a wireless communication session with the called party; and wherein when the wireless communication session is established, the location system generates location information pinpointing a location of the wireless device and provides the location information to the called party.

12. The system of claim 11, wherein the location system is provisioned at one or more of the wireless device, the wireless network, and the called party.

13. The system of claim 11, wherein the called party has exclusive control over the wireless communication session.

14. The system of claim 11, wherein the location system generates subsequent location information during the wireless communication session, and wherein the subsequent location information is provided to the called party.

15. The system of claim 11, wherein the called party uses the location information to perform an action.

16. The system of claim 11, wherein the wireless device further comprises a sensing device, wherein the sensing device captures content during the wireless communication session, and wherein the content is provided to the called party.

17. The system of claim 16, wherein the content comprises a sound.

18. The system of claim 16, wherein the content comprises one or more of an image, a temperature, and a pressure.

19. The system of claim 16, wherein the action comprises using the content to respond to the emergency situation.

20. The system of claim 11, further comprising a signal detector to activate the sensing device.

21. A wireless device for reporting an emergency situation to a called party, the wireless device comprising:

a microprocessor;

a keyboard in communication with the microprocessor;

a signal detector in communication with the microprocessor; and a location system in communication with the microprocessor, wherein when a keystroke sequence is received by the keyboard, the microprocessor deactivates a display of the wireless device, mutes incoming audio signals, and activates the signal detector;

wherein when the signal detector senses a stimulus, the microprocessor establishes a wireless communication session with the called party;

wherein when the wireless communication session is established, the location system generates location information pinpointing a location of the wireless device; and wherein the wireless device transmits the location information to the called party.

22. The wireless device of claim 21, wherein the stimulus comprises a sound.

23. The wireless device of claim 21, wherein the stimulus comprises one or more of an image, a temperature, and a pressure.

24. The wireless device of claim 21, wherein the signal detector comprises a microphone.

25. The wireless device of claim 21, wherein the signal detector comprises one or more of a camera, a thermometer, and a barometer.

26. The wireless device of claim 21, further comprising a sensing device in communication with the microprocessor.

27. The wireless device of claim 26, wherein the sensing device comprises a microphone.

28. The wireless device of claim 26, wherein the sensing device comprises one or more of a camera, a thermometer, and a barometer.

29. The wireless device of claim 26, wherein the sensing device captures content surrounding the wireless device during the wireless communication session.

30. The wireless device of claim 29, wherein the content comprises a sound.

31. The wireless device of claim 29, wherein the content comprises one or more of an image, a temperature, and a pressure.

32. The wireless device of claim 29, wherein the content is transmitted to the called party during the wireless communication session.

33. The wireless device of claim 26, wherein the signal detector and the sensing device are one integrated component.

34. The wireless device of claim 21, wherein the called party has exclusive control over the wireless communication session.

35. A method for reporting an emergency situation to a called party, the method comprising:

creating a relationship between a keystroke sequence and the called party;

storing the relationship in a memory of a wireless device;

receiving the keystroke sequence through a keyboard of the wireless device;

deactivating a display of the wireless device;

establishing a wireless communication session with the called party; muting incoming audio signals of the wireless device;

generating location information pinpointing a location of the wireless device; and providing the location information to the called party during the wireless communication session.

36. The method of claim 35, wherein the wireless device is selected from the group of a wireless telephone, a pager, a handheld computer, and a personal digital assistant.

37. The method of claim 35, wherein the called party has exclusive control over the wireless communication session.

38. The method of claim 35, further comprising the step of maintaining the wireless communication session.

39. The method of claim 35, further comprising the step of using the location information to locate the wireless device.

40. The method of claim 35, further comprising the step of generating subsequent location information, wherein the subsequent location information is provided to the called party.

41. The method of claim 35, wherein the keystroke sequence comprises one of pressing a plurality of keys in seriatim, pressing one key one or more times, and pressing a first key while holding down a second key.

42. The method of claim 35, further comprising the step of storing a user profile in the memory.

43. The method of claim 42, further comprising the step of transmitting the user profile to the called party during the wireless communication session.

44. The method of claim 42, further comprising the step of using the user profile to perform the action.

45. A method for reporting an emergency situation to a called party, the method comprising:

creating a relationship between a keystroke sequence and the called party;

storing the relationship in a memory of a wireless device;

receiving the keystroke sequence through a keyboard of the wireless device;

suspending a display of the wireless device when the keystroke sequence is received;

receiving a stimulus through a signal detector of the wireless device;

establishing a wireless communication session with the called party when the stimulus is received;

muting incoming audio signals of the wireless device;

generating location information pinpointing a location of the wireless device; and providing the location information to the called party.

46. The method of claim 45, wherein the signal detector comprises a microphone.

47. The method of claim 45, wherein the stimulus comprises a sound.

48. The method of claim 45, wherein the signal detector comprises one or more of a camera, a thermometer, and a barometer.

49. The method of claim 45, wherein the stimulus comprises one or more of an image, a temperature, and a pressure.

50. The method of claim 45, further comprising the step of capturing content using a sensing device of the wireless device during the wireless communication session.

51. The method of claim 50, wherein the sensing device comprises a microphone.

52. The method of claim 50, wherein the sensing device comprises one or more a camera, a thermometer, and a barometer.

53. The method of claim 50, wherein the content comprises a sound.

54. The method of claim 50, wherein the content comprises one or more of an image, a temperature, and a pressure.

55. The method of claim 50, wherein the content is transmitted to the called party during the wireless communication session.

56. The method of claim 50, wherein the signal detector and the sensing device are one integrated component.

57. The method of claim 45, further comprising the step of generating subsequent location information, wherein the subsequent location information is provided to the called party.

58. The method of claim 45, wherein the called party has exclusive control over the wireless communication session.

* * * * *